J. E. WERNER.
FRICTION CLUTCH.
APPLICATION FILED SEPT. 17, 1909.
953,727.
Patented Apr. 5, 1910.
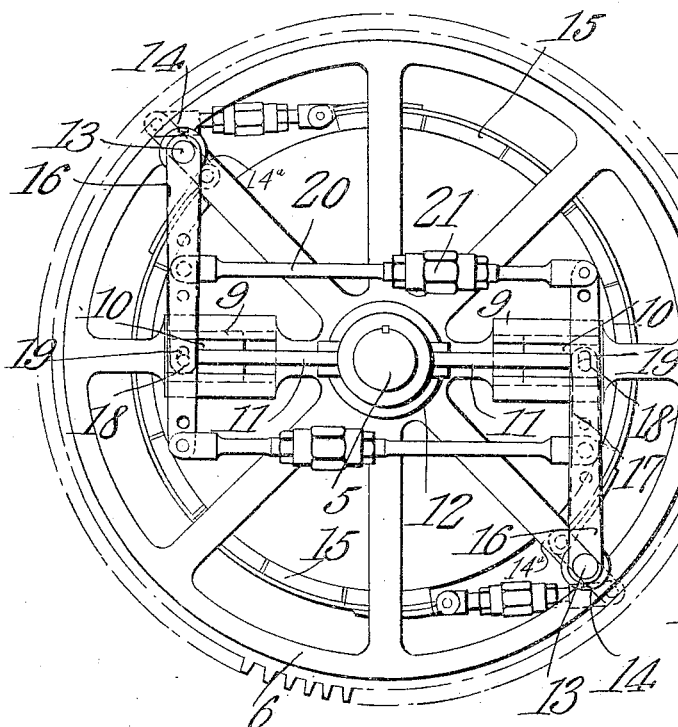
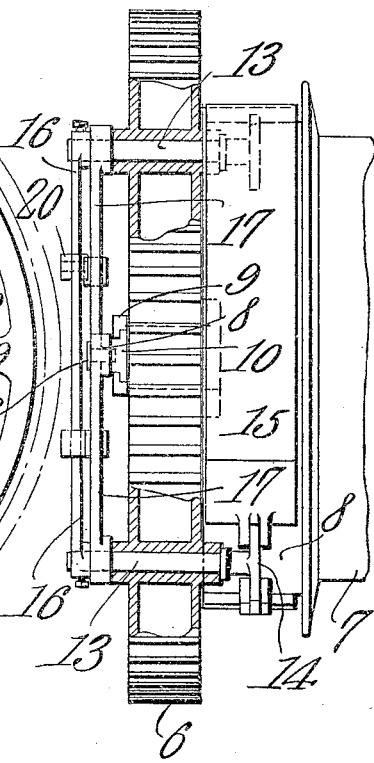
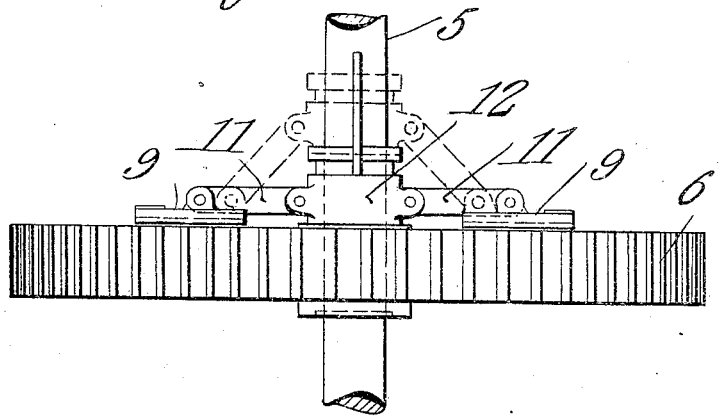
Inventor
John Edward Werner.
Witnesses
By C. A. Snow & Co.
Attorneys

UNITED STATES PATENT OFFICE.

JOHN EDWARD WERNER, OF BANGOR, PENNSYLVANIA.

FRICTION-CLUTCH.

953,727.            Specification of Letters Patent.      Patented Apr. 5, 1910.

Application filed September 17, 1909. Serial No. 518,234.

*To all whom it may concern:*

Be it known that I, JOHN EDWARD WERNER, a citizen of the United States, residing at Bangor, in the county of Northampton and State of Pennsylvania, have invented a new and useful Friction-Clutch, of which the following is a specification.

This invention relates to friction clutches of that kind characterized by a driven member having a drum to which is applied a pair of friction bands connected at their contiguous ends to rocker arms mounted on rock shafts carried by the drive member, and the invention resides more particularly in the means for operating the rock shaft, its object being to provide a comparatively simple arrangement of links and levers for this purpose, by which the clutch may be applied at the expenditure of a small initial force.

With this object in view, the invention consists in a novel construction and arrangement of parts to be hereinafter described and claimed, reference being had to the drawing hereto annexed in which—

Figure 1 is a front elevation showing the application of the invention. Fig. 2 is an edge view thereof, partly broken away. Fig. 3 is an edge view taken from a different point of view than Fig. 2, of the drive member, and the clutch sleeve and toggle links for operating the slide blocks.

Referring more particularly to the drawing, 5 denotes a shaft, on which is keyed or otherwise made fast a drive member 6, which, in the present instance, is shown to be a gear wheel, but it will be understood that said member may be a pulley, or other structure. The drive member is shown as composed of a rim, and a hub, together with spokes connecting said parts.

The driven member is indicated at 7. It is loosely mounted on the shaft 5, and it may be a winding drum, or any other structure to which power is to be applied through the clutch. The drum has a friction rim 8 with which the clutch bands are engageable.

Two diametrically opposite spokes of the gear 6 are enlarged intermediate their ends, and said enlarged portions are formed with guides 9, in each of which is mounted a block 10. These blocks are slidable in the guides, and the latter are so arranged that this sliding movement is radially with respect to the shaft 5. To the sliding blocks are connected one end of toggle links 11, the other ends of which are connected to a sleeve 12 which is splined on the shaft 5, so that it may be slid longitudinally thereon, and at the same time rotate with the shaft.

It will be readily seen from an inspection of Fig. 3 that when the sleeve 12 is moved in the direction of the gear 6, the blocks 10 are forced radially outward in the guides 9, and when the sleeve is moved in the opposite direction, then said blocks are drawn inwardly in the direction of the shaft 5.

At diametrically opposite points, the gear 6 carries in suitable bearings rock shafts 13 having each at one of their ends rocker arms 14 and 14ᵃ. The respective ends of these rocker arms are connected to the contiguous ends of two clutch bands 15 encircling the rim 8 of the drum 7. Upon rocking the shafts 13 in one direction, the bands 15, through the rocker arms 14 and 14ᵃ are caused to grip the rim 8, and upon rocking the shafts 13 in the opposite direction, said rim is released. The following means are provided for operating the rock shafts: To each rock shaft 13 is connected a rocker arm 16, said rocker arm having a hub through which the rock shaft extends. A set screw, key or other means is provided for fastening the rocker arm to the rock shaft. On the hub of each rocker arm 16 is mounted to swing freely thereon a lever 17. One of the levers 17 is connected to one of the slide blocks 10, and the other one of said levers is connected to the other slide block 10. The connection between the slide blocks and the levers is made by a pin 18 carried by the blocks and passing through a slot 19 in the levers. The levers 17 are mounted at one of their ends on the hubs of the rocker arms 16, and their opposite ends are connected respectively to the slide blocks, by reason of which it will be apparent that when said slide blocks are moved inwardly or outwardly in the guides 9, the levers are made to swing therewith, the pivot of the levers being the hubs of the rocker arms. Each lever 17 is connected intermediate its ends by a link 20 to the rocker arm 16 on the opposite side of the shaft 5. This connection with the rocker arm 16 is made at one end thereof, the other end of said rocker arms being connected to the rock shafts 13 as already described. By reason of this connection between the rocker arms 16 and the levers 17, it will be evident that when the levers 17 are swung upon operating the slide blocks 10, the rocker arms 16 are also swung, and as they are made fast to the rock shafts 13, said shafts are rocked in their bearings, thus swinging the arms 18, and tightening or loosening the bands 15, according to the direction in which the slide blocks 10 are moving. The slide blocks are operated by sliding the sleeve 12 toward or from the gear 6 as already described, and said sleeve is provided with a circumferential groove for connection of a suitable clutch lever. It will be noted that the operating mechanism is mounted on diametrically opposite sides of the shaft 5, and the connections are so arranged that the shafts 13 are rocked in the proper direction to clamp or release both bands 15 simultaneously.

By the structure herein described, the clutch can be readily applied with a comparatively small expenditure of power, and the arrangement of links and levers is simple, the number of parts being reduced to a minimum. The gear 6 requires only two openings for the bearings of the rock shafts 13, and therefore is not weakened. The gear may also be provided with any number of spokes. The links 20 may be either plain rods, or rods provided with turn buckles 21 as shown in Fig. 1 of the drawing. The rocker arms 16 and the levers 17 may be provided with a number of holes at the points of connection for the purpose of varying the extent of their swinging movement, thereby taking up wear of the rim 8 and bands 15. Various other minor changes not involving a departure from the invention may also be resorted to.

In the foregoing description, one member of the clutch has been referred to as the drive member, and the other one as the driven member, but it will be understood that the order of transmission of power may be reversed without in any manner affecting the operation of the invention, and furthermore, the mechanism may also be employed to operate as a brake.

What is claimed is:—

1. The combination with a drive and a driven member, of friction bands encircling the driven member, rock shafts carried by the drive member, and operatively connected to the contiguous ends of the friction bands, rocker arms connected to the rock shafts, radially sliding blocks carried by the drive member, means for operating said blocks, a lever connected at one of its ends to one of the sliding blocks and pivotally supported at its other end by one of the rock shafts, a lever connected to the other sliding block, and pivotally supported at its other end by the other rocker shaft, a connection between one of said levers and one rocker arm, and a connection between the other lever and the other rocker arm.

2. The combination with a drive and a driven member, of friction bands encircling the driven member, rock shafts carried by the drive member and operatively connected to the contiguous ends of the friction bands, rocker arms made fast to the rock shafts, said rocker arms having hubs through which the said shafts pass, levers loosely mounted at one of their ends on the hubs, radially sliding blocks carried by the drive member, means for operating said blocks, connections between the sliding blocks and the aforesaid levers, a connection between one of said levers and one of the rocker arms, and a connection between the other lever and the other rocker arm.

3. The combination with a drive and a driven member, of friction bands encircling the driven member, rock shafts carried by the drive member at diametrically opposite points thereon, and operatively connected to the contiguous ends of the friction bands, rocker arms mounted on the rock shafts, said rocker arms being located on opposite sides of the axis of the drive member, and being provided with a hub through which the rock shafts pass, means for fastening said rocker arms on the rock shafts, levers loosely mounted at one of their ends on the hub of the rocker arms, radially sliding blocks carried by the drive member, means for operating said blocks, connections between the sliding blocks and the aforesaid levers, links connecting the rocker arm on one side of the shaft axis with the lever on the opposite side thereof, and a link connecting the other rocker arm to the other lever.

In testimony that I claim the foregoing as my own, I have hereto affixed my signature in the presence of two witnesses.

JOHN EDWARD WERNER.

Witnesses:
 THOMAS R. LEWIS,
 E. P. BUZZARD.